No. 810,518. PATENTED JAN. 23, 1906.
F. BALLENTINE.
ANIMAL TRAP.
APPLICATION FILED SEPT. 5, 1905.
2 SHEETS—SHEET 1.
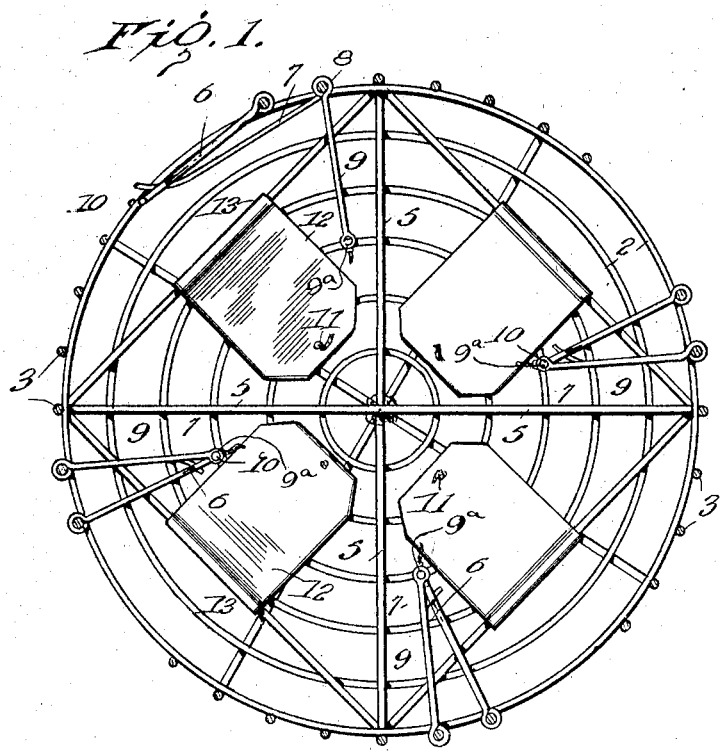
Witnesses
Inventor
F. Ballentine
By R. A. B. Lacey, Attorneys No. 810,518. PATENTED JAN. 23, 1906.
F. BALLENTINE.
ANIMAL TRAP.
APPLICATION FILED SEPT. 5, 1905.
2 SHEETS—SHEET 2.
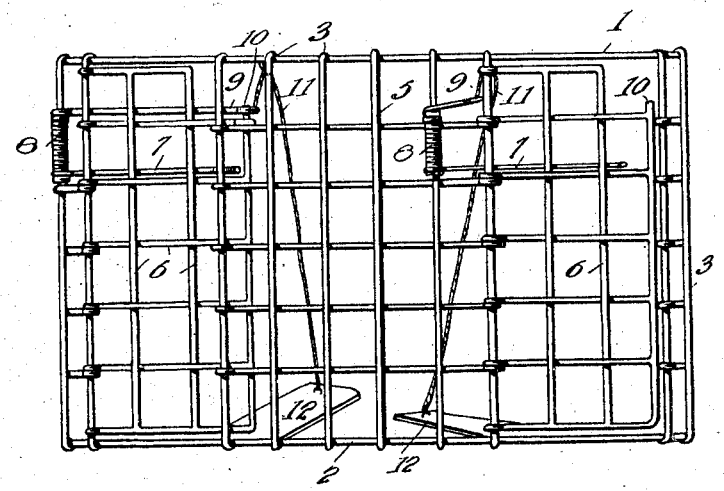
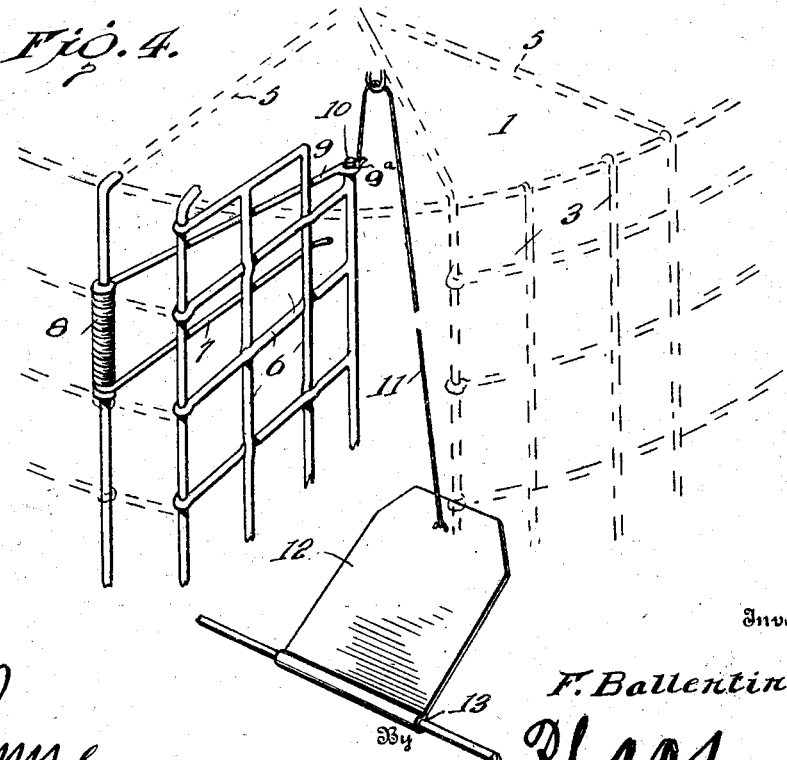

UNITED STATES PATENT OFFICE.

FRED BALLENTINE, OF MOSCOW, OKLAHOMA TERRITORY.

ANIMAL-TRAP.

No. 810,518.　　　　Specification of Letters Patent.　　　　Patented Jan. 23, 1906.

Application filed September 5, 1905. Serial No. 277,029.

*To all whom it may concern:*

Be it known that I, FRED BALLENTINE, a citizen of the United States, residing at Moscow, in the county of Woodward, Territory of Oklahoma, have invented certain new and useful Improvements in Animal-Traps, of which the following is a specification.

This invention consists of a novel construction of traps for rodents or the like.

For a full description of the invention and the merits thereof and also to acquire a knowledge of the details of construction of the means for effecting the result reference is to be had to the following description and accompanying drawings, in which—

Figure 1 is a horizontal sectional view through a trap embodying the invention. Fig. 2 is a horizontal section, broken away, showing one of the doors in closed position. Fig. 3 is a vertical section. Fig. 4 is a perspective view, partially broken away, one of the doors being shown in open position.

Corresponding and like parts are referred to in the following description and indicated in all the views of the drawings by the same reference characters.

A trap embodying the invention comprises, primarily, a top 1, bottom 2, and sides 3. The trap may be of round form, if desired, though this is unessential in the purview of the invention, and it is preferably made of a framework of stout wire of a suitable gage, the interior of the trap being separated into four compartments, more or less, as desired, by means of transverse bars 5, which extend from side to side within the trap. The bars 5 are connected at the ends with the sides in any substantial way, and said bars 5 are arranged sufficiently close to prevent escape of the rodent or animal entrapped from one compartment in the trap to another. Each compartment of the trap is accessible by means of an opening which is adapted to be closed by a door 6, each door 6 being engaged by a spring-arm 7, projecting from an adjacent spring 8, this arm normally tending to shut the door. A trigger-bar 9 is movably attached to a side of each compartment, near the top thereof, and said bar may have an eye 9ª to receive and engage an extension 10, projecting from the upper portion of each door 6. When the extension 10 is engaged by the bar 9, the door is held open as the said bar 9 is connected by a flexible connection 11 with a platform 12, pivoted at 13, and the bottom of the compartment to which access is had by such door. A platform 12 is located in each compartment of the trap, and the inner end of the platform is that connected with the connection 11.

In operation when the trap is set each door 6 is held open by means of the bar 9 coacting therewith, and when said bar is in engagement with the extension 10 of the door 6 the inner end of the platform 12, connected with the bar 9, is slightly elevated. The bait will be located near the inner or remote end of the compartment with regard to the door 6, and when the rodent or animal enters the compartment he must step upon the platform 12 before he can obtain the bait. The platform will be depressed on receiving the weight of the animal, the connection 11 pulled upon, and the bar 9 being thus pulled upwardly releases the door 6 and permits the same to close. The door 6 will be positively held closed by the spring-arm 7, and the animal will be effectively entrapped in a manner which will be readily apparent.

Having thus described the invention, what is claimed as new is—

1. A trap embodying a compartment, a door leading to the compartment, spring means normally tending to hold the door closed, a trigger-bar coacting with the door to hold the same open, a releasing-platform movably mounted in the compartment, and connecting means between said platform and the trigger-bar whereby the trigger-bar may be actuated to permit closing of the door when the platform is moved.

2. A trap comprising a plurality of compartments, a door for each compartment, spring means normally tending to close the door, a trigger-bar for holding the door open, a platform pivotally mounted in each compartment, and a connection between said platform and the trigger-bar, whereby said trigger-bar may be actuated to permit closing of the door.

3. A trap comprising a plurality of compartments, a door for each compartment, an extension projecting from each door at the upper portion thereof, a trigger-bar movably attached to a side of each compartment and adapted to engage the extension of the door adjacent to hold the same open, a spring-arm coacting with the door to close the same, a platform in each compartment pivotally mounted at one end, and a connection between the opposite end of the platform and the trigger-bar whereby movement of the platform will disengage the trigger-bar from the extension of the door to permit closing of the latter.

In testimony whereof I affix my signature in presence of two witnesses.

FRED BALLENTINE. [L. S.]

Witnesses:
J. H. BRITTAIN,
A. D. BRITTAIN.